(12) United States Patent
Pawley

(10) Patent No.: US 9,121,454 B2
(45) Date of Patent: Sep. 1, 2015

(54) OVERRUNNING COUPLING AND CONTROL ASSEMBLY, COUPLING ASSEMBLY AND LOCKING MEMBER FOR USE THEREIN

(71) Applicant: Means Industries, Inc., Saginaw, MI (US)

(72) Inventor: Brice A. Pawley, Midland, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 87 days.

(21) Appl. No.: 14/036,271

(22) Filed: Sep. 25, 2013

(65) Prior Publication Data

US 2014/0102848 A1    Apr. 17, 2014

Related U.S. Application Data

(60) Provisional application No. 61/713,159, filed on Oct. 12, 2012.

(51) Int. Cl.
| | | |
|---|---|---|
| *F16D 41/12* | (2006.01) | |
| *F16D 11/16* | (2006.01) | |
| *F16D 41/16* | (2006.01) | |

(52) U.S. Cl.
CPC .............. *F16D 11/16* (2013.01); *F16D 41/125* (2013.01); *F16D 41/16* (2013.01)

(58) Field of Classification Search
None
See application file for complete search history.

(56) References Cited

U.S. PATENT DOCUMENTS

| | | | |
|---|---|---|---|
| 4,050,560 A | 9/1977 | Torsenfelt | |
| 5,070,978 A | 12/1991 | Pires | |
| 5,362,293 A | 11/1994 | Romanauskas | |
| 5,597,057 A * | 1/1997 | Ruth et al. | ............ 192/46 |
| 5,638,929 A | 6/1997 | Park | |
| 5,678,668 A | 10/1997 | Sink | |
| 5,918,715 A | 7/1999 | Ruth et al. | |
| 5,927,455 A | 7/1999 | Baker et al. | |
| 5,964,331 A | 10/1999 | Reed et al. | |
| 6,116,394 A | 9/2000 | Ruth | |

(Continued)

FOREIGN PATENT DOCUMENTS

| | | |
|---|---|---|
| EP | 1 944 520 A2 * | 7/2008 |
| WO | WO 2008/070539 A2 * | 6/2008 |

OTHER PUBLICATIONS

International Search Report and Written Opinion, International application No. PCT/US2013/062799; date of mailing Feb. 25, 2014.

(Continued)

*Primary Examiner* — Rodney H Bonck
(74) *Attorney, Agent, or Firm* — Brooks Kushman P.C.

(57) ABSTRACT

A locking member for controllably transmitting torque between first and second coupling members of a coupling assembly is provided. The locking member includes projecting inner and outer pivots which extend laterally from a main body portion for enabling pivotal motion of the locking member about a pivot axis which intersects the pivots. The pivots are sized, shaped and located with respect to the main body portion to allow frictional engagement of an end surface of the outer pivot with an outer wall of a pocket to occur near the pivot axis during rotation of the first coupling member and the locking member above a predetermined RPM thereby reducing overall moment on the locking member about the pivot axis that has to be overcome to move the locking member between the engaged and disengaged positions.

36 Claims, 7 Drawing Sheets

(56) References Cited

U.S. PATENT DOCUMENTS

| | | | |
|---|---|---|---|
| 6,129,190 | A | 10/2000 | Reed et al. |
| 6,186,299 | B1 | 2/2001 | Ruth |
| 6,193,038 | B1 | 2/2001 | Scott et al. |
| 6,244,965 | B1 | 6/2001 | Klecker et al. |
| 6,290,044 | B1 | 9/2001 | Burgman et al. |
| 6,503,167 | B1 | 1/2003 | Sturm |
| 6,571,926 | B2 | 6/2003 | Pawley |
| 6,814,201 | B2 | 11/2004 | Thomas |
| 6,953,409 | B2 | 10/2005 | Schmidt et al. |
| 7,093,512 | B2 | 8/2006 | Ibamoto et al. |
| 7,100,756 | B2 | 9/2006 | Kimes et al. |
| 7,198,587 | B2 | 4/2007 | Samie et al. |
| 7,223,198 | B2 | 5/2007 | Kimes et al. |
| 7,256,510 | B2 | 8/2007 | Holmes et al. |
| 7,258,214 | B2 | 8/2007 | Pawley et al. |
| 7,275,628 | B2 | 10/2007 | Pawley et al. |
| 7,344,010 | B2 | 3/2008 | Fetting, Jr. et al. |
| 7,349,010 | B2 | 3/2008 | Bryant et al. |
| 7,464,801 | B2 | 12/2008 | Wittkopp |
| 7,484,605 | B2 | 2/2009 | Pawley et al. |
| 7,491,151 | B2 | 2/2009 | Maguire et al. |
| 7,743,678 | B2 | 6/2010 | Wittkopp et al. |
| 7,824,292 | B2 | 11/2010 | Samie et al. |
| 7,942,781 | B2 | 5/2011 | Kimes |
| 7,992,695 | B2 | 8/2011 | Wittkopp et al. |
| 8,011,464 | B2 | 9/2011 | Samie et al. |
| 8,042,669 | B2 | 10/2011 | Samie et al. |
| 8,042,670 | B2 | 10/2011 | Bartos et al. |
| 8,051,959 | B2 | 11/2011 | Eisengruber |
| 8,056,690 | B2 | 11/2011 | Samie et al. |
| 8,061,496 | B2 | 11/2011 | Samie et al. |
| 8,079,453 | B2 | 12/2011 | Kimes |
| 8,083,042 | B2 | 12/2011 | Samie et al. |
| 8,087,502 | B2 | 1/2012 | Samie et al. |
| 2006/0185957 | A1 | 8/2006 | Kimes et al. |
| 2008/0110715 | A1 | 5/2008 | Pawley |
| 2008/0169166 | A1 | 7/2008 | Wittkopp et al. |
| 2008/0185253 | A1 | 8/2008 | Kimes |
| 2008/0223681 | A1 | 9/2008 | Stevenson et al. |
| 2009/0098970 | A1 | 4/2009 | Kimes |
| 2009/0194381 | A1 | 8/2009 | Samie et al. |
| 2010/0063693 | A1 | 3/2010 | Lee et al. |
| 2010/0200358 | A1 | 8/2010 | Eisengruber et al. |
| 2010/0230226 | A1 | 9/2010 | Prout |
| 2010/0252384 | A1 | 10/2010 | Eisengruber |
| 2011/0183806 | A1 | 7/2011 | Wittkopp et al. |
| 2011/0214962 | A1 | 9/2011 | Shaw et al. |
| 2011/0233026 | A1 | 9/2011 | Pawley |
| 2011/0297500 | A1 | 12/2011 | Shaw et al. |

OTHER PUBLICATIONS

International Preliminary Report on Patentability, International application No. PCT/US2013/062799; date of issuance of report Apr. 14, 2015.

* cited by examiner $$M_{neteng} = F_{SN} \cdot (B) - F_{apply} \cdot (C) + t \cdot F_C \cdot \left( \frac{ww + ww \cdot \tan(\theta_{Rch}) \cdot \mu}{zz(1 + \mu \cdot \tan(\theta_{Rch}))} + \frac{\cos(\theta_{oech}) \cdot \mu}{2} \right)$$

$$M_{netdis} = F_{SN} \cdot (B) + t \cdot F_C \cdot \left( \frac{ww - ww \cdot \tan(\theta_{Rch}) \cdot \mu}{zz(1 - \mu \cdot \tan(\theta_{Rch}))} - \frac{\cos(\theta_{oech}) \cdot \mu}{2} \right)$$

$$F_{iretainerplate} = F_C \cdot \left[ (\tan(\theta_{Rch}) - \mu) \cdot \left[ \frac{ww}{zz \cdot (1 - \mu \cdot \tan(\theta_{Rch}))} \right] + \frac{t}{2 \cdot J} \right] + \frac{H \cdot (F_{apply} + F_{SN})}{J}$$

$$F_{oretainerplate} = F_{apply} + F_S - F_{iretainerplate} + F_C \cdot \left[ \tan(\theta_{Rch}) + \mu \cdot \left[ \frac{ww}{zz \cdot (1 + \mu \cdot \tan(\theta_{Rch}))} \right] + \cos(\theta_{oech}) \cdot \sin(\theta_{oech} \theta) \right]$$

Fig. 14

OVERRUNNING COUPLING AND CONTROL ASSEMBLY, COUPLING ASSEMBLY AND LOCKING MEMBER FOR USE THEREIN

CROSS REFERENCE TO RELATED APPLICATIONS

This application claims the benefit of U.S. provisional patent application No. 61/713,159 filed Oct. 12, 2012.

TECHNICAL FIELD OF THE INVENTION

This invention relates to overrunning coupling and control assemblies and coupling assemblies and locking members for use therein.

Overview

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

roller type which includes spring-loaded rollers between inner and outer races of the one-way clutch. (Roller type is also used without springs on some applications); and sprag type which includes asymmetrically shaped wedges located between inner and outer races of the one-way clutch.

One way clutches typically over run during engine braking rather than enable engine braking. It is for this reason there is a friction pack at the same transmission node. Selectable dynamic clutches can be used to prevent the over running condition and enable engine braking Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. Nos. 7,258, 214 and 7,484,605 disclose an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include: 2011/0183806; 2011/0233026; 2011/0297500; 2011/0214962; 2010/0252384; 2010/0230226; 2010/0063693; 2010/0200358; 2009/0098970; 2009/0194381; 2008/0223681; 2008/0110715; 2008/0169166; 2008/0185253; 2006/0185957; and the following U.S. Pat. Nos. 7,942,781; 8,079, 453; 7,992,695; 8,051,959; 8,011,464; 8,042,669; 8,061,496; 8,042,670; 8,056,690; 8,083,042; 8,087,502; 7,824,292; 7,743,678; 7,491,151; 7,464,801; 7,349,010; 7,275,628; 7,256,510; 7,223,198; 7,198,587; 7,100,756; 7,093,512; 6,953,409; 6,814,201; 6,503,167; 6,193,038; 6,116,394; 6,186,299; 6,571,926; 4,050,560; 5,638,929; 5,362,293; 5,678,668; 5,918,715; 5,070,978; and 5,964,331.

Metal injection molding (MIM) is a metalworking process where finely-powdered metal is mixed with a measured amount of binder material to comprise a "feedstock" capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A "moment of force" (often just moment) is the tendency of a force to twist or rotate an object. A moment is valued mathematically as the product of the force and a moment arm. The moment arm is the perpendicular distance from the point or axis of rotation to the line of action of the force. The moment may be thought of as a measure of the tendency of the force to cause rotation about an imaginary axis through a point.

In other words, a "moment of force" is the turning effect of a force about a given point or axis measured by the product of the force and the perpendicular distance of the point from the line of action of the force. Generally, clockwise moments are called "positive" and counterclockwise moments are called "negative" moments. If an object is balanced then the sum of the clockwise moments about a pivot is equal to the sum of the counterclockwise moments about the same pivot or axis.

FIG. 1 is a top plan view of a prior art locking member or strut, generally indicated at 10, received and nominally retained within a pocket 12 of a coupling face 14 of a coupling member, generally indicated at 16, such as a pocket plate. At high rotational speeds, such as 2000 RPM and above, the strut 10 locks itself against outer walls 18 of the pocket 12 due to centrifugal frictional affects at reactive forces, $F_{R1}$ and $F_{R2}$, which are spaced a relatively large distance from an engagement rotational axis 20 of the strut 10. Consequently, the overall movement that has to be overcome to engage and disengage the strut 10 with respect to a second coupling member (not shown in FIG. 1, but shown in many of the other Figures) such as a notch plate is quite large.

There is a need to reduce the overall movements on prior art locking members about their pivot axes that have to be overcome to move the locking members between engaged and disengaged positions of the locking members with respect to coupling members during high speed rotation of the coupling members which retain the locking members.

SUMMARY OF EXAMPLE EMBODIMENTS

In a locking member embodiment, a locking member for controllably transmitting torque between first and second coupling members of a coupling assembly is provided. The first coupling member includes a coupling face having a pocket which is sized and shaped to receive and nominally retain the locking member. The locking member includes a member-engaging first end surface, a member-engaging second end surface and an elongated main body portion between the end surfaces. The locking member also includes projecting inner and outer pivots which extend laterally from the main body portion for enabling pivotal motion of the locking member about a pivot axis which intersects the pivots. The end surfaces of the locking member are movable between engaged and disengaged positions with respect to the coupling members during the pivotal motion whereby one-way torque transfer may occur between the coupling members. The pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions.

The overall moment on the locking member may be negative during pivotal moment of the locking member from the disengaged position to the engaged position.

The overall moment on the locking member may be positive during pivotal motion of the locking member from the engaged position to the disengaged position.

The inner pivot may be notched to allow frictional engagement of a side surface of the notched inner pivot with an inner wall of the pocket and to prevent rotation of the locking member in the pocket.

Center of gravity of the locking member may be located within the main body portion and spaced away from the pivot axis.

The pocket may provide sufficient clearance to allow sliding movement of the locking member during movement of the locking member between the engaged and disengaged positions.

The locking member may be a locking strut.

The locking member may be an injection molded locking member such as a metal injection molded locking member.

The locking member may be seesaw-shaped.

In a coupling assembly embodiment, an engageable coupling assembly is provided. The assembly includes first and second coupling members. The first coupling member has a coupling face with a pocket which is sized and shaped to receive and nominally retain a locking member. The locking member includes a member-engaging first end surface, a member-engaging second end surface and an elongated main body portion between the end surfaces. The locking member also includes projecting inner and outer pivots which extend laterally from the main body portion for enabling pivotal motion of the locking member about a pivot axis which intersects the pivots. The end surfaces of the locking member are movable between engaged and disengaged positions with respect to the coupling members during the pivotal motion whereby one-way torque transfer may occur between the coupling members. The pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions.

The overall moment on the locking member may be negative during pivotal moment of the locking member from the disengaged position to the engaged position.

The overall moment on the locking member may be positive during pivotal motion of the locking member from the engaged position to the disengaged position.

The inner pivot may be notched to allow frictional engagement of a side surface of the notched inner pivot with an inner wall of the pocket and to prevent rotation of the locking member in the pocket.

Center of gravity of the locking member may be located within the main body portion and spaced away from the pivot axis.

The pocket may provide sufficient clearance to allow sliding movement of the locking member during movement of the locking member between the engaged and disengaged positions.

The locking member may be a locking strut.

The locking member may be an injection molded locking member such as a metal injection molded locking member.

The locking member may be seesaw-shaped.

In a coupling and control assembly embodiment, an overrunning coupling and control assembly is provided. The assembly includes first and second coupling members. The first coupling member has a first face with a pocket which is sized and shaped to receive and nominally retain a locking member and a second face having a passage in communication with the pocket to communicate an actuating force to the locking member to actuate the locking member within the pocket so that the locking member moves between the engaged and disengaged positions. The locking member includes a member-engaging first end surface, a member-engaging second end surface and an elongated main body portion between the end surfaces. The locking member also includes projecting inner and outer pivots which extend laterally from the main body portion for enabling pivotal motion of the locking member about a pivot axis which intersects the pivots. The end surfaces of the locking member are movable between engaged and disengaged positions with respect to the coupling members during the pivotal motion whereby one-way torque transfer may occur between the coupling members. The pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions.

The overall moment on the locking member may be negative during pivotal moment of the locking member from the disengaged position to the engaged position.

The overall moment on the locking member may be positive during pivotal motion of the locking member from the engaged position to the disengaged position.

The inner pivot may be notched to allow frictional engagement of a side surface of the inner pivot with an inner wall of the pocket and to prevent rotation of the locking member in the pocket.

Center of gravity of the locking member may be located within the main body portion and spaced away from the pivot axis.

The pocket may provide sufficient clearance to allow sliding movement of the locking member during movement of the locking member between the engaged and disengaged positions.

The locking member may be a locking strut.

The locking member may be an injection molded locking member such as a metal injection molded locking member.

The locking member may be seesaw-shaped.

The assembly may further include a biasing member that biases the locking member against pivotal motion of the locking member towards the engaged position wherein the actuating force pivots the locking member against the bias of the biasing member.

An actuator such as a spring actuator may be received with the passage to provide the actuating force.

The first coupling member may be a pocket plate.

The first face may be an annular coupling face.

The first face may be a plurality of pockets and the second face may have a plurality of passages in communication with their respective pockets. Each passage of the plurality of passages may communicate an actuating force to its respective locking member to actuate its respective locking member within its respective pocket.

The assembly may also include a plurality of biasing members that bias their respective locking members against pivotal motion of their locking members towards their engaged positions wherein the actuating forces pivot their respective locking members against the bias of their respective biasing members.

The coupling members may be clutch members.

The pocket may have an inner recess for receiving a biasing spring and the pocket may be a spring pocket.

The annular coupling face may be oriented to face axially along a rotational axis of the assembly.

The first and second faces may be generally annular and extend generally radially with respect to a rotational axis of the assembly.

Objects, features and technical advantages of at least one embodiment of the present invention are readily apparent to one skilled in the art from the following detailed description and claims when taken in connection with the accompanying drawings and in view of the prior art.

BRIEF DESCRIPTION OF THE DRAWINGS

FIG. 14 shows a number of equations related to the quantities noted on the previous drawing Figures, reading from top to bottom: the first equation is the net or overall moment on the locking member at the time of locking member engagement; the second equation is the net or overall moment at the time of locking member disengagement; the third equation is a summation of forces on the retainer plate at the inner pivot or ear; and the fourth equation is a summation of forces on the retainer plate at the outer pivot or ear.

DETAILED DESCRIPTION OF EXAMPLE EMBODIMENTS

Figure 1:
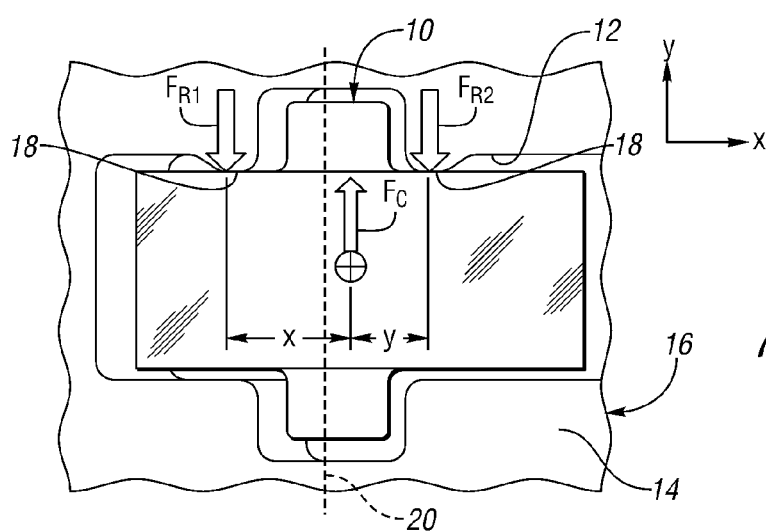
FIG. 1 is a top plan view, partially broken away, of a prior art locking member or strut located in a pocket of a rotating pocket plate together with a pivot axis of the strut, different reactive forces, $F_{R1}$ and $F_{R2}$, and a centrifugal force $F_{CG}$ at a center of gravity of the strut.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 2, 4, 5 and 6 there is illustrated an asymmetrical seesaw-shaped, locking member or strut, generally indicated at 22, constructed or made in accordance with at least one embodiment of the present invention. The locking member 22 controllably transmits torque between first and second clutch or coupling members, generally indicated at 24 and 26, respectively, of a coupling assembly, generally indicated at 28 in FIGS. 6-13.

The first coupling member 24 may be a pocket plate which can rotate in either a clockwise direction or a counter-clockwise direction (as indicated at 29) about the rotational axis (not shown) of the assembly 28 and includes a generally flat, annular coupling face 30 having a plurality of pockets, generally indicated at 32, each one of which is sized and shaped to receive and nominally retain a locking member such as the locking member 22. The pockets 32 are spaced about the axis of the assembly 28. The face 30 is oriented to face axially in a first direction along the rotational axis of the assembly 28.

The second clutch member 26 may be a notch plate and has a generally flat, annular coupling second face 33 opposed to the first face 30 and oriented to face axially in a second direction opposite the first direction along the rotational axis of the assembly 28. The second face 33 has a plurality of locking formations 35 that are engaged by the locking members 22 upon projection from the pockets 32 to prevent relative rotation of the first and second members 24 and 26 with respect to each other in at least one direction about the axis of the assembly 28.

The locking member 22 includes a member-engaging first end surface 34, a member-engaging second end surface 36, and an elongated main body portion 38 between the end surfaces 34 and 36. The locking member 22 also includes projecting inner and outer pivots 40 and 42, respectively, which extend laterally from the main body portion 38 for enabling pivotal motion of the locking member 22 about a pivot axis 44 of the locking member 22 which intersects the pivots 40 and 42. The end surfaces 34 and 36 of the locking member 22 are movable between engaged (FIGS. 9, 10 and 13) and disengaged (FIGS. 6, 7 and 8) positions with respect to the coupling members 24 and 26 during the pivotal motion whereby one-way torque transfer may occur between the coupling members 24 and 26 in the engaged positions of the locking members 22.

In general, the pivots 40 and 42 are sized, shaped and located with respect to the main body portion 38 to allow frictional engagement of an end surface 45 of the outer pivot 42 (FIGS. 11 and 12) with an outer wall 46 of the pocket 32 to occur near the pivot axis 44 during rotation of the first coupling member 24 and the retained locking member 22 above a predetermined RPM, thereby significantly reducing overall moment on the locking member 22 about the pivot axis 44 that has to be overcome to move the locking member 22 between its engaged and disengaged positions.

The assembly 28 also includes an apertured retainer element or plate 47 as shown in FIGS. 3 and 6-13 supported between the first and second clutch members 24 and 26, respectively. The retainer element 47 has at least one opening extending completely therethrough to allow the locking members or struts 22 to extend therethrough and lock the first and second clutch members 24 and 26, respectively, together. The upper surfaces of the pivots 40 and 42 pivot against the lower surface of the retainer plate 47 during such movement.

Figure 8:
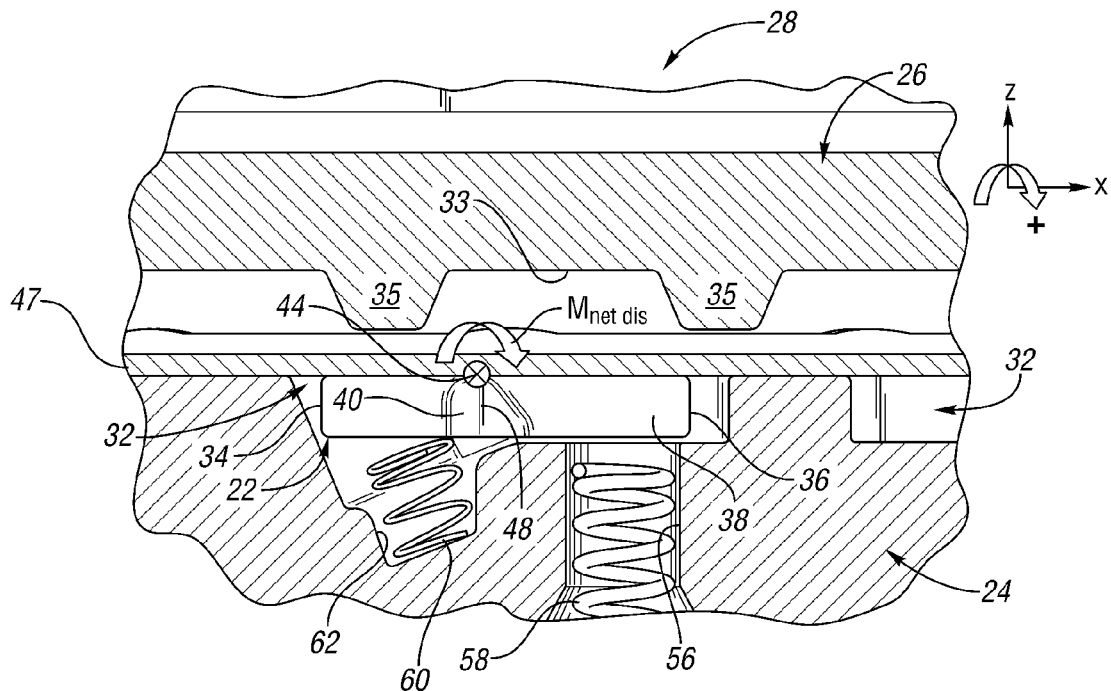
FIG. 8 is a view similar to the views of FIGS. 6 and 7 and showing a positive overall moment on the locking member to rotate the locking member in a clockwise direction towards the locking member disengagement position.
Figure 10:
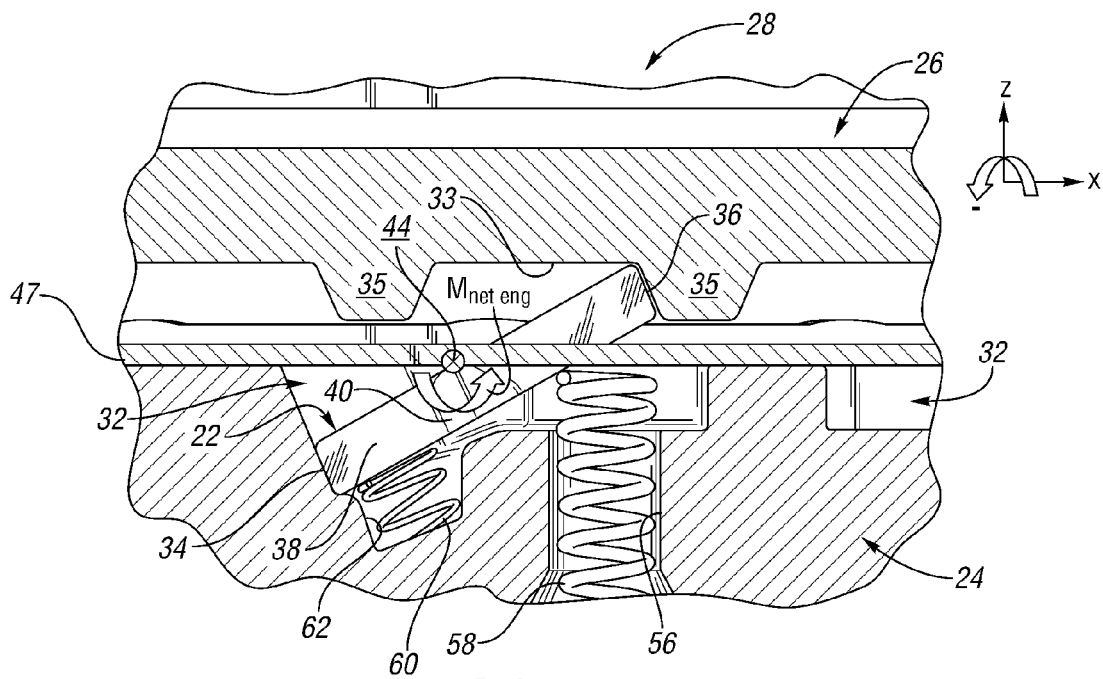
FIG. 10 is a view similar to the view of FIG. 9 and also showing a negative overall moment on the locking member to rotate the locking member in a counterclockwise direction about the pivot axis towards the locking member engagement position.
Figure 11:
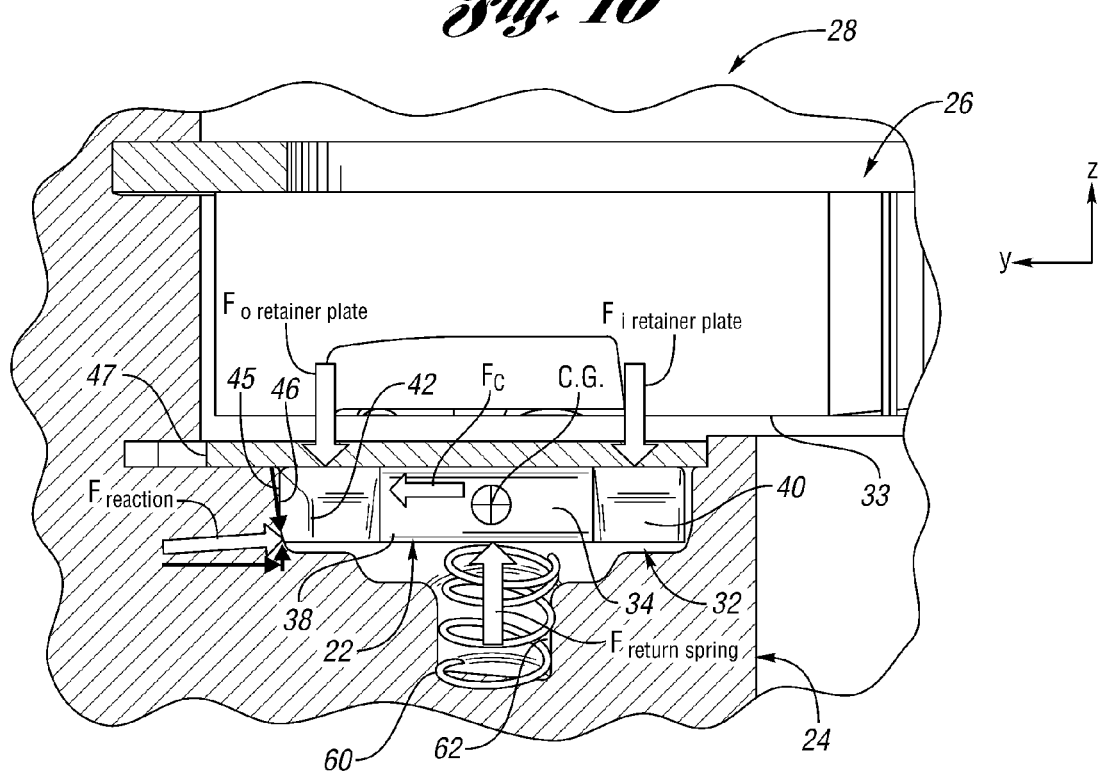
FIG. 11 is an end view, partially broken away and in cross section, of the locking member retained with the pocket of the pocket plate by the retainer plate and further showing the reaction force between the outer pivot of the locking member and the outer wall of the pocket as well as the inner and outer retainer reaction forces on the pivots, the centrifugal force and the return spring force.
Figure 12:
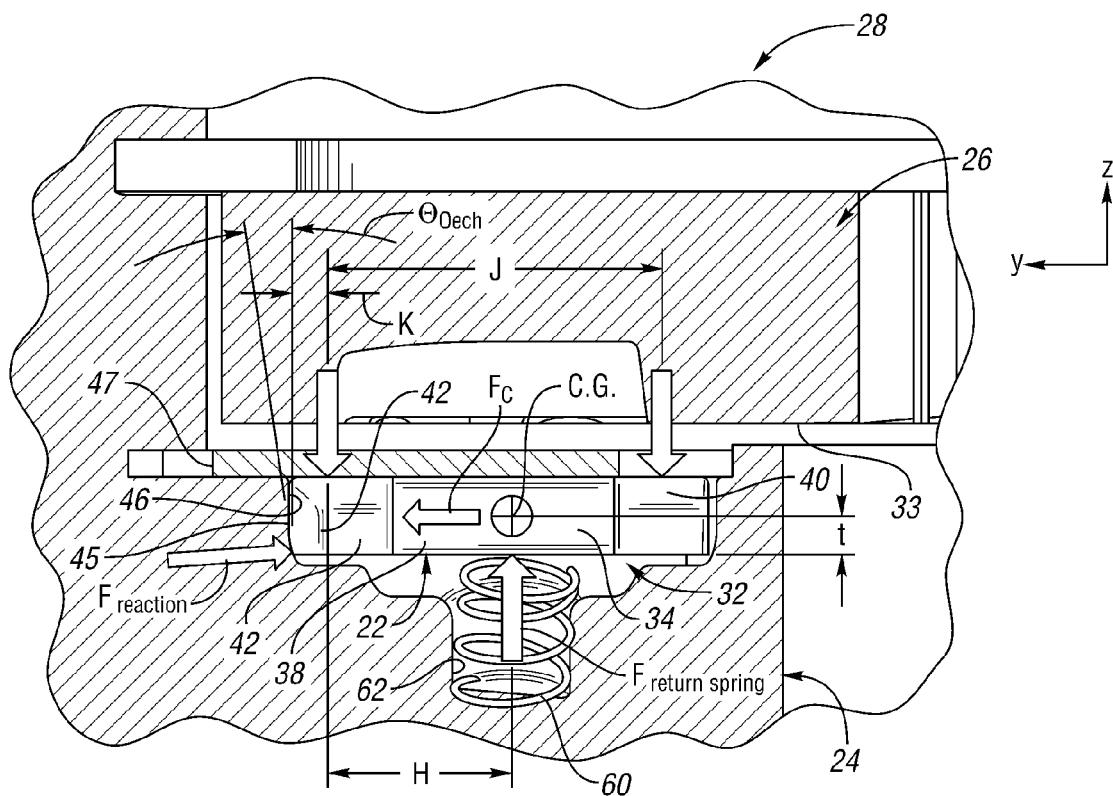
FIG. 12 is a view similar to FIG. 11 but showing various moment arms, forces and an angle $\theta_{Oech}$, between the reaction force at the outer wall of the pocket and the outer surface of the outer pivot.

As shown in FIG. 10, the overall or net moment on the locking member 22 is negative during pivotal moment of the locking member 22 from the disengaged position of FIG. 8 to the engaged position of FIG. 10.

Figure 9:
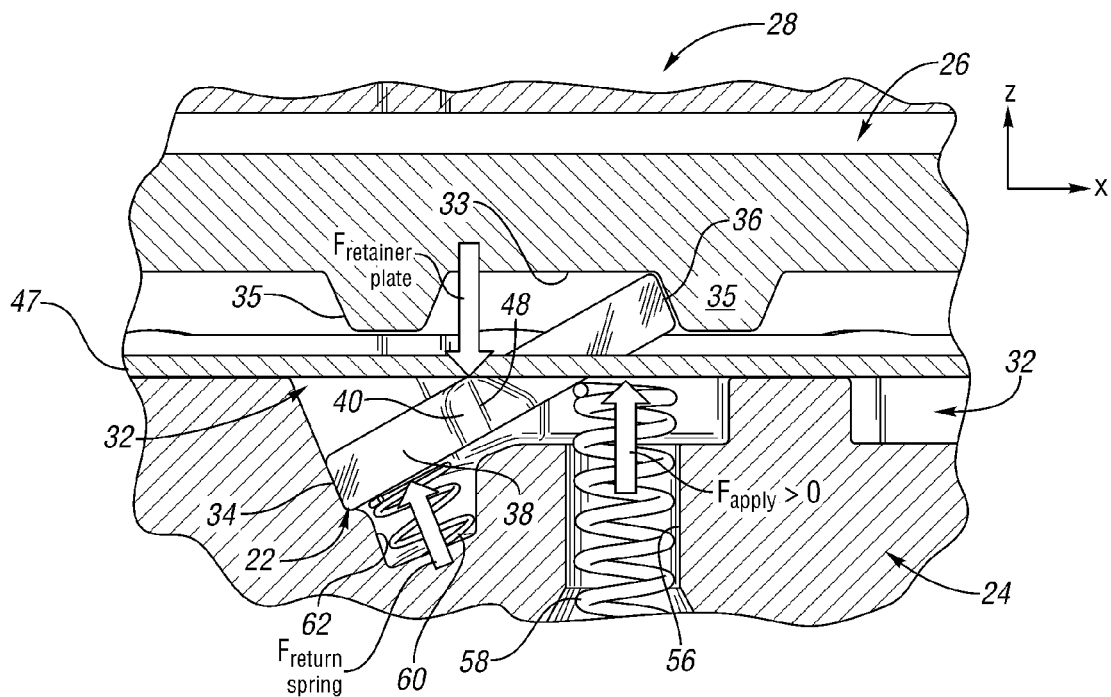
FIG. 9 is a view similar to the views of FIGS. 6-8 with the apply force, $F_{apply}$, greater than zero to cause the locking member to rotate in a counterclockwise direction about the pivot axis of the locking member against the biasing action of the return spring.

As shown in FIG. 8, the overall or net moment on the locking member 22 is positive during pivotal motion of the locking member 22 from the engaged position of FIG. 9 to the disengaged position of FIG. 8.

Figure 2:
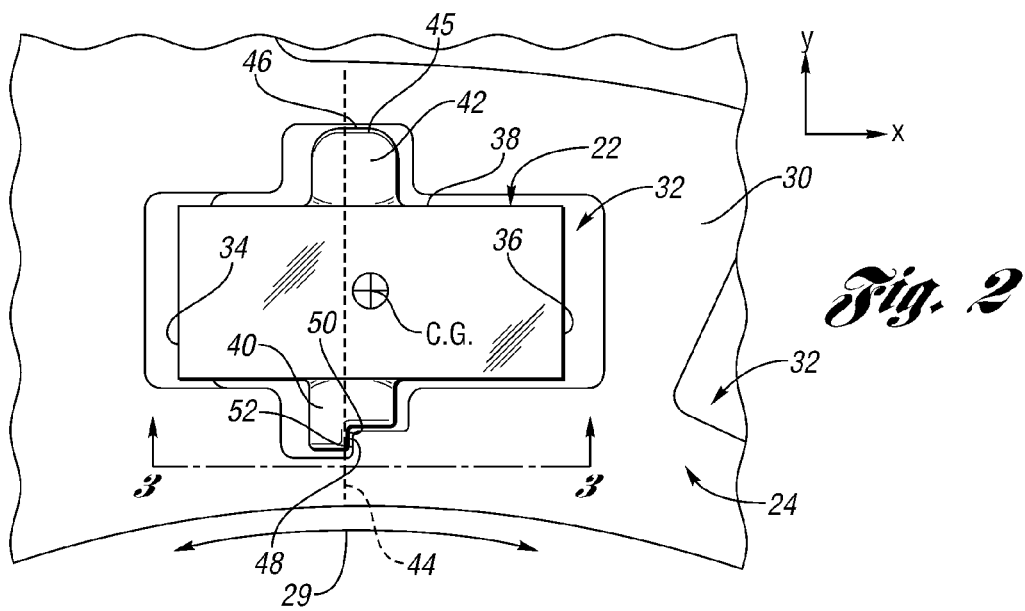
FIG. 2 is a view similar to the view of FIG. 1 including a pocket plate having a pocket retaining a locking member or strut constructed in accordance with at least one embodiment of the present invention showing a pivot axis of the member and center of gravity of the member.
Figure 3:
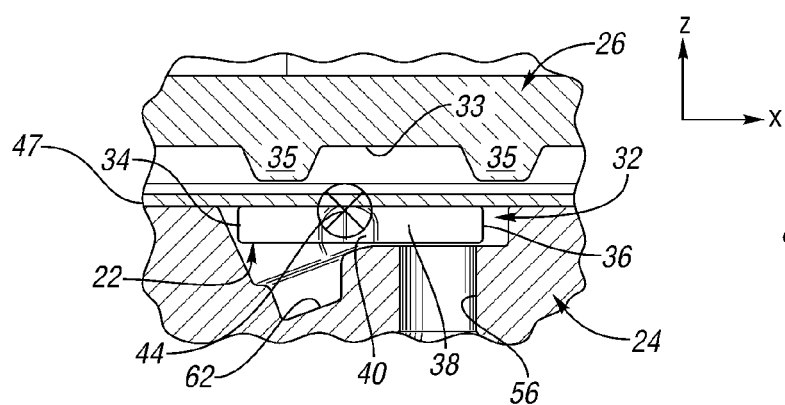
FIG. 3 is a sectional, partially broken away view of the pocket plate of FIG. 2 taken along lines 3-3 and also showing a retainer plate and a notch plate of a coupling assembly constructed in accordance with at least one embodiment of the present invention.
Figure 4:
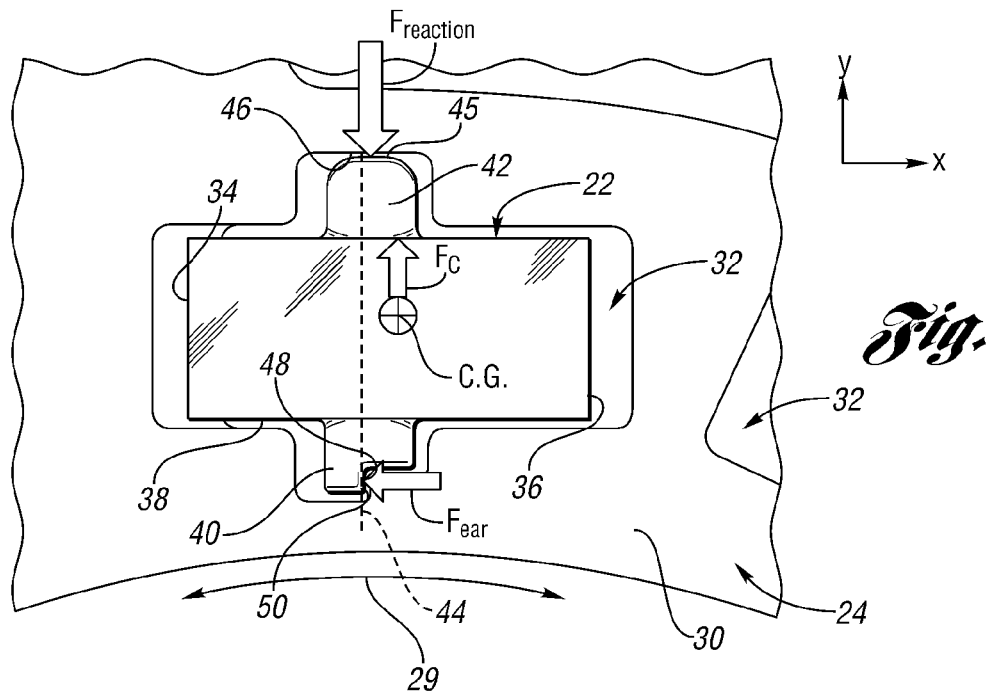
FIG. 4 is a view similar to the view of FIG. 3 but showing a pair of reaction forces, $F_{reaction}$ and $F_{ear}$, to the centrifugal force $F_c$ acting at the center of gravity of the locking member.
Figure 5:
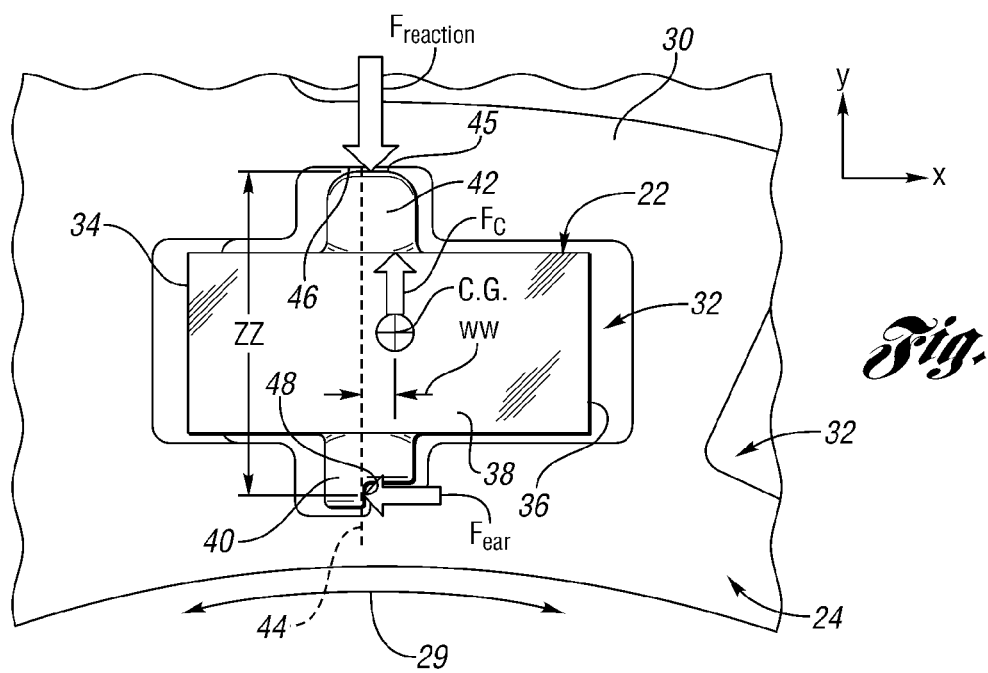
FIG. 5 is a view similar to the view of FIG. 4 but showing various moment arms.
Figure 6:
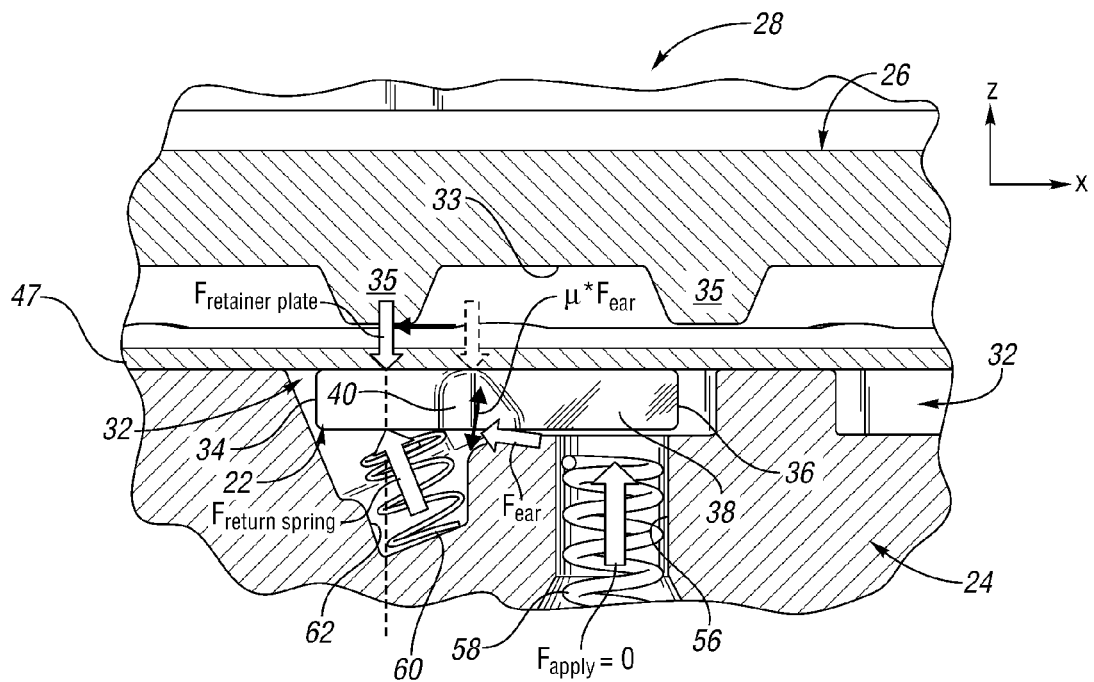
FIG. 6 is an enlarged view, similar to the view of FIG. 3, but also showing a return spring (and its force) and an apply spring (and its force) and also showing how a retention force, $F_{retainer\,plate}$, applied by a retainer plate shifts when the apply spring is retracted and also showing the frictional engagement of a wall of the pocket with a side surface of a notched inner pivot of the locking member.
Figure 7:
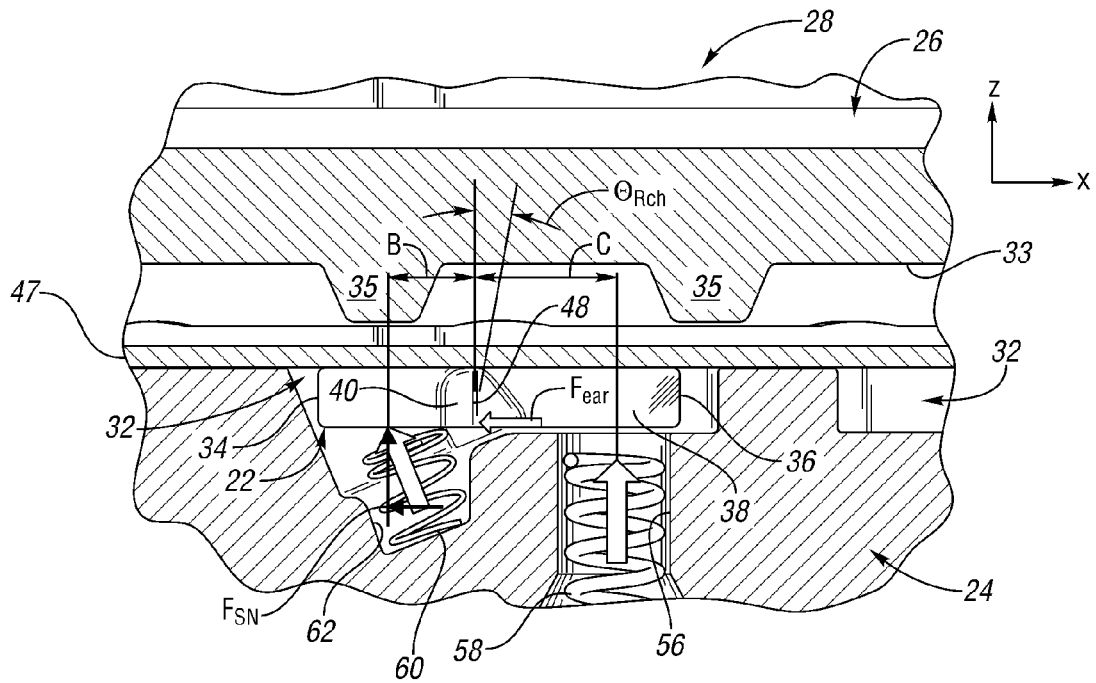
FIG. 7 is a view similar to the view of FIG. 6 showing various moment arms and an angle, $\theta_{Rch}$, between the side surface of the notched pivot and the reaction force on the notched pivot.

As best shown in FIGS. 2, 4 and 5, the inner pivot 40 is notched as indicated at 48, to allow frictional engagement of a side surface 50 of the notched inner pivot 40 with an inner wall 52 (FIG. 2) of the pocket 32 and to prevent rotation of the locking member 22 in the pocket 32. The outer pivot 42 may also be notched in like fashion so that the locking member 22 can be used as either a forward locking member or a reverse locking member.

Center of gravity (i.e., C.G.) of the locking member 22 is located within the main body portion 38 (i.e., FIG. 5) and spaced away from the pivot axis 44.

Figure 13:
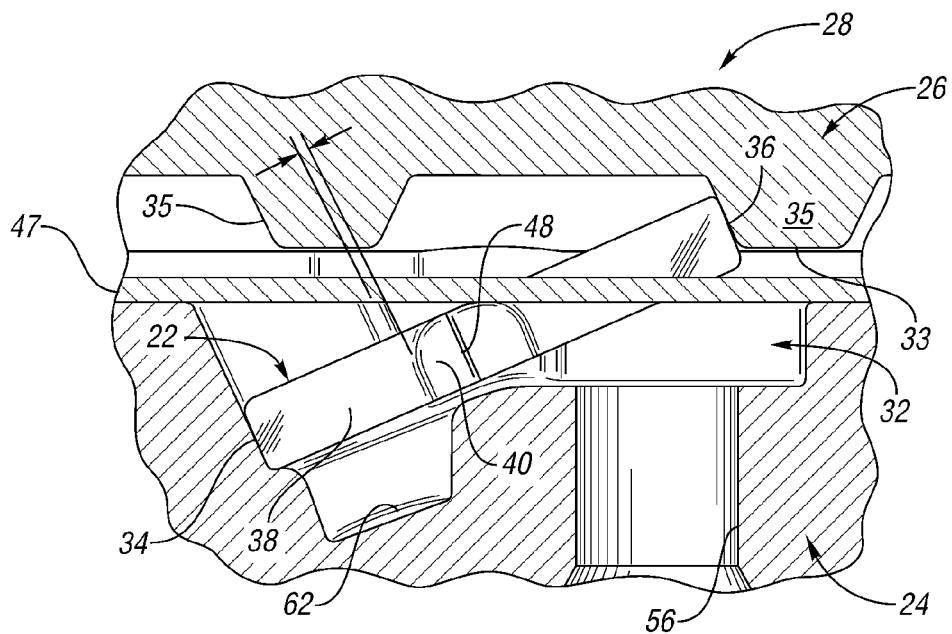
FIG. 13 is an enlarged view similar to the views of FIGS. 6-10 and showing a space between a pivot and a channel wall of the pocket to ensure that the pivot does not contact the channel wall.

As best shown in FIG. 13, the pocket 32 provides sufficient clearance to allow sliding movement of the locking member 22 during movement of the locking member 22 between the engaged and disengaged positions.

The locking member 22 may be an injection molded locking member such as a metal injection molded locking member or part.

The first coupling member 24 also has a face (not shown but opposite the first face 30) having a plurality of passages 56 spaced about the rotational axis of the assembly 28 and including a passage 56 in communication the pocket 32 as shown in FIGS. 6-10. The passages 56 communicate actuating forces to their respective locking members 22 within their respective pockets 32. The first face 30 and the opposite face are generally annular and extend generally radially with respect to the rotational axis of the assembly 28.

Actuators, such as spring actuators including a spring actuator 58, may be received within the passage 56 to provide the actuating forces to actuate the locking members 22 within their respective pockets 32 so that the locking members 22 move between their engaged and disengaged positions. Other types of actuators beside the spring actuators 58 may be used to provide the actuating forces. Also, pressurized fluid may be used to provide the actuating forces.

Biasing members such as coiled return springs including a coiled return spring 60 bias the locking members 22 against pivotal motion of the locking members 22 towards their engaged positions. The spring actuators 58 pivot their locking members 22 against the bias of the spring biasing members 60 as shown in FIGS. 9 and 10. Each pocket 32 has an inner recess 62 for receiving its respective biasing spring 60 wherein the pocket 32 is a spring pocket.

Other technical advantages will be readily apparent to one skilled in the art from the following figures, descriptions and claims. Moreover, while specific advantages have been enumerated, various embodiments may include all, some or none of the enumerated advantages.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A locking member for controllably transmitting torque between first and second coupling members of a coupling assembly, the first coupling member including a coupling face having a pocket which is sized and shaped to receive and nominally retain the locking member, the locking member comprising:
  a member-engaging first end surface;
  a member-engaging second end surface;
  an elongated main body portion between the end surfaces; and
  projecting inner and outer pivots which extend laterally from the main body portion for enabling pivotal motion of the locking member about a pivot axis which intersects the pivots, the end surfaces of the locking member being movable between engaged and disengaged positions with respect to the coupling members during the pivotal motion whereby one-way torque transfer may occur between the coupling members and wherein the pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions wherein the inner pivot is notched to allow frictional engagement of a side surface of the notched inner pivot with an inner wall of the pocket and to prevent rotation of the locking member in the pocket .

2. The locking member as claimed in claim 1, wherein the overall moment on the locking member is negative during pivotal moment of the locking member from the disengaged position to the engaged position.

3. The locking member as claimed in claim 1, wherein the overall moment on the locking member is positive during pivotal motion of the locking member from the engaged position to the disengaged position.

4. The locking member as claimed in claim 1, wherein center of gravity of the locking member is located within the main body portion and spaced away from the pivot axis.

5. The locking member as claimed in claim 1, wherein the pocket provides sufficient clearance to allow sliding movement of the locking member during movement of the locking member between the engaged and disengaged positions.

6. The locking member as claimed in claim 1, wherein the locking member is a locking strut.

7. The locking member as claimed in claim 1, wherein the locking member is an injection molded locking member.

8. The locking member as claimed in claim 7, wherein the locking member is a metal injection molded locking member.

9. The locking member as claimed in claim 1, wherein the locking member is seesaw-shaped.

10. An engageable coupling assembly comprising:
  first and second coupling members, the first coupling member having a coupling face with a pocket which is sized and shaped to receive and nominally retain a locking member, the locking member including:
    a member-engaging first end surface;
    a member-engaging second end surface;
    an elongated main body portion between the end surfaces; and
    projecting inner and outer pivots which extend laterally from the main body portion for enabling pivotal motion of the locking member about a pivot axis which intersects the pivots, the end surfaces of the locking member being movable between engaged and disengaged positions with respect to the coupling members during the pivotal motion whereby one-way torque transfer may occur between the coupling members and wherein the pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions wherein the inner pivot is notched to allow frictional engagement of a side surface of the notched inner pivot with an inner wall of the pocket and to prevent rotation of the locking member in the pocket.

11. The assembly as claimed in claim 10, wherein the overall moment on the locking member is negative during pivotal moment of the locking member from the disengaged position to the engaged position.

12. The assembly as claimed in claim 10, wherein the overall moment on the locking member is positive during pivotal motion of the locking member from the engaged position to the disengaged position.

13. The assembly as claimed in claim 10, wherein center of gravity of the locking member is located within the main body portion and spaced away from the pivot axis.

14. The assembly as claimed in claim 10, wherein the pocket provides sufficient clearance to allow sliding movement of the locking member during movement of the locking member between the engaged and disengaged positions.

15. The assembly as claimed in claim 10, wherein the locking member is a locking strut.

16. The assembly as claimed in claim 10, wherein the locking member is an injection molded locking member.

17. The assembly as claimed in claim 16, wherein the locking member is a metal injection molded locking member.

18. The assembly as claimed in claim 10, wherein the locking member is seesaw-shaped.

19. An overrunning coupling and control assembly comprising:
  first and second coupling members, the first coupling member having a first face with a pocket which is sized and shaped to receive and nominally retain a locking member and a second face having a passage in communication with the pocket to communicate an actuating force to the locking member to actuate the locking member within the pocket so that the locking member moves between the engaged and disengaged positions, the locking member including:
    a member-engaging first end surface;
    a member-engaging second end surface;
    an elongated main body portion between the end surfaces; and
    projecting inner and outer pivots which extend laterally from the main body portion for enabling pivotal motion of the locking member about a pivot axis which intersects the pivots, the end surfaces of the locking member being movable between engaged and disengaged positions with respect to the coupling members during the pivotal motion whereby one-way torque transfer may occur between the coupling members and wherein the pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions wherein the inner pivot is notched to allow frictional engagement of a side surface of the inner pivot with an inner wall of the pocket and to prevent rotation of the locking member in the pocket.

20. The assembly as claimed in claim 19, wherein the overall moment on the locking member is negative during pivotal moment of the locking member from the disengaged position to the engaged position.

21. The assembly as claimed in claim 19, wherein the overall moment on the locking member is positive during pivotal motion of the locking member from the engaged position to the disengaged position.

22. The assembly as claimed in claim 19, wherein center of gravity of the locking member is located within the main body portion and spaced away from the pivot axis.

23. The assembly as claimed in claim 19, wherein the pocket provides sufficient clearance to allow sliding movement of the locking member during movement of the locking member between the engaged and disengaged positions.

24. The assembly as claimed in claim 19, wherein the locking member is a locking strut.

25. The assembly as claimed in claim 19, wherein the locking member is an injection molded locking member.

26. The assembly as claimed in claim 25, wherein the locking member is a metal injection molded locking member.

27. The assembly as claimed in claim 19, wherein the locking member is seesaw-shaped.

28. The assembly as claimed in claim 19, further comprising an actuator received within the passage to provide the actuating force.

29. The assembly as claimed in claim 19, wherein the first coupling member is a pocket plate.

30. The assembly as claimed in claim 19, wherein the first face is an annular coupling face.

31. The assembly as claimed in claim 30, wherein the annular coupling face is oriented to face axially along a rotational axis of the assembly.

32. The assembly as claimed in claim 19, wherein the coupling members are clutch members.

33. The assembly as claimed in claim 19, wherein the pocket has an inner recess for receiving a biasing spring and wherein the pocket is a spring pocket.

34. The assembly as claimed in claim 19, wherein the first and second faces are generally annular and extend generally radially with respect to a rotational axis of the assembly.

35. An overrunning coupling and control assembly comprising:
first and second coupling members, the first coupling member having a first face with a pocket which is sized and shaped to receive and nominally retain a locking member and a second face having a passage in communication with the pocket to communicate an actuating force to the locking member to actuate the locking member within the pocket so that the locking member moves between the engaged and disengaged positions, the locking member including:
a member-engaging first end surface;
a member-engaging second end surface;
an elongated main body portion between the end surfaces; and
projecting inner and outer pivots which extend laterally from the main body portion for enabling pivotal motion of the locking member about a pivot axis which intersects the pivots, the end surfaces of the locking member being movable between engaged and disengaged positions with respect to the coupling members during the pivotal motion whereby one-way torque transfer may occur between the coupling members and wherein the pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions further comprising a biasing member that biases the locking member against pivotal motion of the locking member towards the engaged position wherein the actuating force pivots the locking member against the bias of the biasing member.

36. An overrunning coupling and control assembly comprising:
first and second coupling members, the first coupling member having a first face with a pocket which is sized and shaped to receive and nominally retain a locking member and a second face having a passage in communication with the pocket to communicate an actuating force to the locking member to actuate the locking member within the pocket so that the locking member moves between the engaged and disengaged positions, the locking member including:
a member-engaging first end surface;
a member-engaging second end surface;
an elongated main body portion between the end surfaces; and
projecting inner and outer pivots which extend laterally from the main body portion for enabling pivotal motion of the locking member about a pivot axis which intersects the pivots, the end surfaces of the locking member being movable between engaged and disengaged positions with respect to the coupling members during the pivotal motion whereby one-way torque transfer may occur between the coupling members and wherein the pivots are sized, shaped and located with respect to the main body portion to allow frictional engagement of an end surface of the outer pivot with an outer wall of the pocket to occur near the pivot axis during rotation of the first coupling member and the retained locking member above a predetermined RPM thereby reducing overall moment on the locking member about the pivot axis that has to be overcome to move the locking member between the engaged and disengaged positions and wherein the first face has a plurality of pockets and the second face has a plurality of passages in communication with their respective pockets, each passage of the plurality of passages communicating an actuating force to its respective locking member to actuate its respective locking member within its respective pocket wherein the assembly includes a plurality of biasing members that bias their respective locking members against pivotal motion of their locking members towards their engaged positions wherein the actuating forces pivot their respective locking members against the bias of their respective biasing members.

* * * * *